(12) United States Patent
Kudryavtsev et al.

(10) Patent No.: US 12,337,309 B2
(45) Date of Patent: Jun. 24, 2025

(54) METHOD OF MANUFACTURING INORGANIC ION EXCHANGER FOR THE SELECTIVE EXTRACTION OF LITHIUM FROM LITHIUM-CONTAINING NATURAL AND TECHNOLOGICAL BRINES

(71) Applicants: Pavel Kudryavtsev, Rehovot (IL); Nikolai Kudriavtsev, Haifa (IL)

(72) Inventors: Pavel Kudryavtsev, Rehovot (IL); Nikolai Kudriavtsev, Haifa (IL)

( * ) Notice: Subject to any disclaimer, the term of this patent is extended or adjusted under 35 U.S.C. 154(b) by 644 days.

(21) Appl. No.: 17/688,005

(22) Filed: Mar. 7, 2022

(65) Prior Publication Data

US 2023/0278024 A1    Sep. 7, 2023

(51) Int. Cl.
 *B01J 45/00* (2006.01)
 *C22B 3/42* (2006.01)
 *C22B 26/12* (2006.01)

(52) U.S. Cl.
 CPC .......... *B01J 45/00* (2013.01); *C22B 3/42* (2013.01); *C22B 26/12* (2013.01)

(58) Field of Classification Search
 CPC ........ C22B 3/42; C22B 26/12; B01J 2523/56; B01J 2523/69
 See application file for complete search history.

(56) References Cited

U.S. PATENT DOCUMENTS 4,277,147 A * 7/1981 Arnoldussen ......... G02F 1/1524
                                                    359/270
7,943,113 B2    5/2011 Chung et al.
(Continued)

FOREIGN PATENT DOCUMENTS

CN    101944600 A    1/2011
RU    1524253       2/1994
(Continued)

OTHER PUBLICATIONS

Bhat (HNbWO6 and HTaWO6: Novel Layered Oxides Related to the Rutile Structure, Synthesis, and Investigation of Ion Exchange and Intercalation Behavior, 1987 (Solid State Ionics vol. 26 (1988) p. 25-32)) (Year: 1988).*

(Continued)

*Primary Examiner* — Ian A Rummel
*Assistant Examiner* — Annette Phan (57) ABSTRACT

Proposed is a method of manufacturing an inorganic ion exchanger with improved selectivity for lithium. The exchanger is represented by the following general formula: $H_aNbO_{(2.5+0.5 \cdot a)} \cdot bLi_2O \cdot cWO_3 \cdot dH_2O$, wherein "a" is a number ranging from 0.5 to 2.0, "b" is a number ranging from 0.01 to 0.5, "c" is a number ranging from 0.01 to 0.2, and "d" is a number ranging from 0.1 to 2.0. The method consists of: interacting a soluble niobate (V) with an acid to form a hydrated niobium (V) oxide and a hydrated tungsten (VI) oxide, which co-precipitate and form a mixed hydrated niobium (V) and tungsten (VI) oxide; granulating the obtained product; converting the granulated product into a lithium form; calcining the lithium form to obtain a mixed granulated tripled lithium, niobium (V) and tungsten (VI) oxide, and converting the lithium-form into an H-form of the inorganic ion-exchanger by treating it with an acid solution.

17 Claims, 5 Drawing Sheets

(56) References Cited

U.S. PATENT DOCUMENTS

| | | | |
|---|---|---|---|
| 8,901,032 | B1 | 12/2014 | Harrison et al. |
| 8,926,974 | B2 | 6/2015 | Chung et al. |
| 10,434,497 | B2 | 10/2019 | Kudryavtsev et al. |
| 11,179,715 | B2 | 11/2021 | Kudryavtsev et al. |
| 2019/0184373 | A1* | 6/2019 | Kudryavtsev ........ B01J 20/3085 |
| 2020/0254437 | A1* | 8/2020 | Kudryavtsev ............ B01J 49/53 |

FOREIGN PATENT DOCUMENTS

| | | |
|---|---|---|
| WO | WO2003041857 | 5/2002 |
| WO | WO2011058841 | 5/2011 |

OTHER PUBLICATIONS

Bhat (HNbWO6 and HTaWO6: Novel Layered Oxides Related to the Rutile Structure, Synthesis, and Investigation of Ion Exchange and Intercalation Behavior, 1987 (Solid State Ionics vol. 26 (1988) p. 25-32)) (Year: 1998).*

Abrahams S.C., Reddy J.M., Bernstein J.L. Ferroelectric lithium niobates. 3 rep. J.Phys. Chem, Solid, 1966, vol. 27, p. 997-1010

Mulliken P.S. A new electroaffinity scale; together with data on valence states and valence ionization potentials and electron affinities.—J. Chem. Phys., 1934, vol. 3, p. 782-793.

\* cited by examiner

METHOD OF MANUFACTURING INORGANIC ION EXCHANGER FOR THE SELECTIVE EXTRACTION OF LITHIUM FROM LITHIUM-CONTAINING NATURAL AND TECHNOLOGICAL BRINES

FIELD OF THE INVENTION

The invention relates to the field of chemical technology and hydrometallurgy, in particular, to production of selective inorganic ion exchangers for the extraction of lithium from lithium-containing natural and technological brines. The invention may find use in extracting lithium from neutral and slightly alkaline solutions with a high content of sodium ions and ions of other alkali and alkaline earth metals. More specifically, the above invention relates to a technology for recovering lithium in the presence of oxidizing or reducing agents and under conditions of increased radiation. The method is based on the processes of preparation and use of ion sieves.

DESCRIPTION OF THE PRIOR ART

Lithium has historically been obtained from two different sources—continental brines and hard rock minerals. Currently, lithium is used in the production of glass, ceramics, medical substances, metallurgical products, lithium batteries, and in such areas as nuclear energy, aviation, etc. Global sales of lithium salts are now worth more than a billion a year, and a demand for lithium will continue to grow because lithium is an indispensable component of the lithium-ion batteries that are now used as a power source for everything from smartphones, power tools, to electric vehicles.

Lithium demand is forecast to grow by more than 300% in the coming years. Moreover, electric companies are expanding solar energy production and experience a need for lithium-ion batteries of high storage density. The acute dependence of many global industries on lithium has led to a global search for new sources of lithium.

Currently, hydromineral raw materials are gradually becoming the main source of lithium. At the same time, in world practice, the main attention is paid to developing methods for processing lithium-containing hydromineral raw materials. Nowadays, a method that is most often used in practice to extract lithium is the precipitation of sparingly soluble salts from natural brines.

From an ecological point of view, however, the most advantageous are methods of extracting lithium by sorption from lithium-poor natural and technological brines. More so, these sources contain main world reserves of lithium. Due to the complexity of the salts contained in the composition of hydromineral raw materials, highly selective inorganic ion-exchange materials become most promising for the realization of the above methods.

Some inventions illustrating the state of the art of extracting lithium using selective inorganic ion-exchange materials are shown below.

Chinese Patent Application Publication CN101944600A published on Jan. 12, 2011 (inventors: Xichang Shi, et Al.) discloses an ion sieve adsorbent for extraction of lithium ions based on lithium-titanium oxide and a method for preparing a precursor for this ion sieve adsorbent suitable for adsorbing enriched lithium from salt-lake brines, seawater, and other liquid lithium resources. The method consists of using titanium dioxide and lithium salt as raw materials, grinding the raw material in a ball grinder, and drying the ground product for preparing lithium titanate as the precursor through a high-temperature solid-phase roasting process. The lithium is then eluted from the precursor ($Li_2TiO_3$) by inorganic acid to prepare an ion sieve $H_2TiO_3$. According to a preferred embodiment, the process is based on a molar ratio of lithium to titanium of 2:1; anhydrous ethanol or acetone is used as a dispersion medium; grinding is carried out in a ball mill from 2 to 3 hours; the grounded product is calcined at 800° C. for 12 hours; and, as a result, a lithium $Li_2TiO_3$ adsorbent is obtained.

U.S. Pat. No. 8,901,032, issued on Dec. 2, 2014, to Stephen Harrison et al., discloses a method for producing a porous adsorbent based on activated alumina for lithium extraction. The method is carried out by contacting three-dimensional activated alumina with a lithium salt under conditions sufficient to infuse lithium salts into activated alumina for the selective extraction and recovery of lithium from lithium-containing solutions, including brines. Lithium intercalated sorbent based on activated alumina provides a controlled and maximum permissible lithium to aluminum ratio and a favorable structural shape and dispersed composition, thereby increasing throughput for extracting lithium. In certain embodiments, the lithium intercalated sorbent based on activated alumina has a molar fraction ratio of lithium to aluminum in the range of about 0.1 to 0.3 and preferably up to about 0.33. The ratio of lithium to alumina is critical in stabilizing the structural form of the material and maximizing the number of lithium sites available in the matrix for loading and unloading of lithium from the brine solution.

International Patent Application Publication No. WO2003041857 A1, published on May 22, 2003 (Inventor: Alexander Ryabstsev, et al.), relates to a method for producing granulated sorbents in the form of the double hydroxide of aluminum and lithium in a waste-free solid phase of aluminum hydroxide and lithium salts in a mixer, with subsequent continuous activation of crystalline DHAL-Cl in a centrifugal mill activator to obtain a defective crystalline structure. The obtained product is mixed with chlorinated polyvinyl chloride as a binding agent and liquid methylene chloride. The granulated sorbent is suitable for selective lithium extraction from chloride salt minerals with an extraction degree of 95 at. %.

Also known is Russian Patent No. 1524253, issued on Feb. 15, 1994, to Melikhov et al. This patent relates to ion exchange removal of lithium from solutions. The method includes the steps of passing the solutions through a sorption material consisting of a sorbent selective to lithium and based on manganese oxides or manganese and aluminum oxides in a hydrogen form and an auxiliary sorbent in a salt form, followed by their regeneration, respectively, with a solution of nitric acid and alkaline solution. The method is characterized in that, to increase the degree of lithium recovery from the natural and technological brines, as well as the degree of regeneration of the auxiliary sorbent and the reduction of the regeneration time, the sorbent is selective to lithium in an alkaline medium based on titanium hydroxide, the transmission is conducted through alternating layers of the selective and auxiliary sorbents, and the regeneration of the auxiliary sorbent is carried out with the original lithium solution at pH 12-13. A hydrated titanium dioxide or a mixed hydroxide of titanium and iron is used as an auxiliary sorbent. A disadvantage of this method is that the obtained sorbent has low stability in the presence of oxidants or reducing agents.

U.S. Pat. No. 7,943,113, May 17, 2011 (Chung; Kang-Sup и др.) discloses a method for preparing lithium-manganese oxides comprising: solid mixing lithium raw material, manganese raw material, and metal raw material—the material is expressed as the following chemical formula to manufacture mixture; and heat-treating the mixture under reduction atmosphere, $Li_{1+x}Mn_{1-xy}M_yO_{2+z}$, wherein 0.01≤x≤0.5, 0≤y≤0.3, −0.2≤z≤0.2, and M is a metal selected from the group consisting of Mn, V, Cr, Co, Ni, Cu, Zn, Zr, Nb, Mo, W, Ag, Sn, Ge, Si, Al, and an alloy thereof, and wherein the lithium-manganese oxides have a layered structure.

U.S. Pat. No. 8,926,874, Jan. 6, 2015 (Chung; Kang-Sup и др.) discloses a porous manganese oxide absorbent for lithium having spinel-type structure and a method of manufacturing the same. This invention relates to a porous manganese oxide-, based lithium absorbent and a method for preparing the same. The method includes the steps of preparing a mixture by mixing a reactant for the synthesis of a lithium-manganese oxide precursor powder with an inorganic binder, molding the mixture, preparing a porous lithium-manganese oxide precursor molded body by heat-treating the molded mixture, and acid-treating the porous lithium-manganese oxide precursor molded body such that lithium ions of the porous lithium-manganese oxide precursor are exchanged with hydrogen ions, wherein pores are formed in the lithium-manganese oxide precursor molded body by gas generated in the heat treatment. The method comprises the steps of preparing a lithium-manganese oxide precursor molded body by preparing a mixture by adding an additive comprising at least one selected from the group consisting of carbon powder, carbon nanotubes (CNT), polyethylene (PE), and polypropylene (PP) to a lithium-manganese oxide precursor reactant, adding water glass to the mixture. Heat-treating the resulting mixture, wherein the water glass is added in an amount of 10 to 60 parts by weight concerning 100 parts by weight of the mixture. Acid-treating the lithium-manganese oxide precursor molded body, wherein in the heat treatment, pores are formed in the lithium-manganese oxide precursor molded body by gas generated by decomposition of the lithium manganese oxide precursor reactant or the water glass.

International Patent Application Publication No WO 2011058841 Priority Applications May 22, 2003. This patent describes a method for producing raw materials for a lithium adsorbent, concentrating lithium, and an apparatus for concentrating lithium. This method comprises a mechanochemical step for mixing trimanganese tetraoxide and lithium hydroxide such that the molar ratio of manganese (x) and lithium (y) is x:y=1:1 to 1.5:1, and subjecting the mixture to mechanochemical pulverization; a pre-calcining step for then pre-calcining in a temperature range of 375° C. to 450° C. in the air or an oxygen atmosphere; a calcining step for then cooling, mixing, and pulverizing, followed by calcining in a temperature range of 475° C. to 550° C. in the air or an oxygen atmosphere to obtain a spinel-type lithium manganate with excess oxygen; an elution step for eluting lithium by treating the spinel-type lithium manganate with excess oxygen using acid in an amount that is in large excess for the amount of lithium.

U.S. Pat. No. 10,434,497 filed on Dec. 14, 2017, by P. Kudryavtsev et al., for a "Method of Obtaining Inorganic Sorbents for Extracting Lithium from Lithium-Containing Natural and Technological Brines" discloses a method of obtaining inorganic sorbents for extracting lithium from lithium-containing natural and technological brines. The method is carried out by contacting a soluble niobate (V) with an acid in the presence of at least one zirconium (IV) salt to obtain a precipitate of a mixed hydrated niobium and zirconium oxide. Subsequent steps include granulating the precipitate by freezing, converting the granulation product into a Li-form, calcining the Li-form, and converting the obtained granulated mixed lithium, niobium, and zirconium oxide into an ion-exchanger in an H-form. The inorganic sorbent is ready for use in lithium extraction processes in the obtained H-form. U.S. Pat. No. 11,179,715 issued to P. Kudryavtsev et al. on Nov. 23, 2021, relates to an Inorganic ion-exchanger for selective lithium extraction from lithium-containing natural and industrial brines. The inorganic ion-exchanger is a non-stoichiometric compound in the form of a polymeric aqua-oxo-hydroxo complex. It is intended for selective extraction of lithium from lithium-containing natural and industrial brines. The following general formula represents the proposed ion-exchanger: $H_a NbO_{(2.5+0.5 \cdot a)} \cdot cZrO_2 \cdot dH_2O$, wherein: "a" is a number ranging from 0.5 to 1.5, "c" is a number ranging from 0.01 to 1.0, "d" is a number ranging from 0.1 to 2.0. The inorganic ion-exchanger is a polymeric aqua-oxo-hydroxo complex of niobium and zirconium in the form of solid particles.

SUMMARY OF THE INVENTION

The invention relates to the field of chemical technology and hydrometallurgy, in particular, to production of selective inorganic ion exchangers for the extraction of lithium from lithium-containing natural and technological brines. The invention may find use in extracting lithium from neutral and slightly alkaline solutions with a high content of sodium ions and ions of other alkali and alkaline earth metals. The method is based on the preparation and use of ion sieves. The invention makes it possible to improve sorbents' selectivity and exchange capacity for lithium-based on niobium oxide and improve chemical stability of such sorbents in cyclic operations.

More specifically, the method of the invention is aimed at manufacturing an inorganic ion-exchanger in the form of solid particles, which constitute a chemical non-stoichiometric compound in the form of an inorganic polymeric aqua-oxo-hydroxo complex intended for selective extraction of lithium from lithium-containing natural and industrial brines, the inorganic ion-exchanger being represented by the following general formula:

$$H_aNbO_{(2.5+0.5 \cdot a)} \cdot bLi_2O \cdot cWO_3 \cdot dH_2O$$

wherein:
  "a" is a number ranging from 0.5 to 2.0,
  "b" is a number ranging from 0.01 to 0.5,
  "c" is a number ranging from 0.01 to 0.2, and
  "d" is a number ranging from 0.1 to 2.0.

The method consists of the following steps:
  interacting a soluble niobate (V) with an acid that contains at least one tungsten (VI) compound, thus forming a hydrated niobium (V) oxide and a hydrated tungsten (VI) oxide, which co-precipitate and form a mixed hydrated niobium (V) and tungsten (VI) oxide;
  granulating the mixed hydrated niobium (V) and tungsten (VI) oxide by freezing thereof with subsequent defreezing, thus obtaining a granulated mixed hydrated niobium (V) and tungsten (VI) oxide;
  converting the granulated mixed hydrated niobium (V) and tungsten (VI) oxide into a lithium form by treating thereof with a lithium-containing compound selected from the group consisting of aqueous solutions of lithium hydroxide and lithium carbonate;
  calcining the lithium form of the granulated mixed hydrated niobium (V) and tungsten (VI) oxide to obtain a mixed tripled lithium, niobium (V) and tungsten (VI) oxide in granulated form, which constitutes a lithium-form of the inorganic ion-exchanger; and
  converting the lithium-form of the inorganic ion-exchanger into an H-form of the inorganic ion-exchanger by treating thereof with an acid solution selected from the group consisting of nitric ($HNO_3$), hydrochloric (HCl), sulfuric ($H_2SO_4$) or perchloric acid ($HClO_4$).

The invention relates to the field of chemical technology and hydrometallurgy, in particular, to production of selective inorganic ion exchangers for the extraction of lithium from lithium-containing natural and technological brines. The invention may find use in extracting lithium from neutral and slightly alkaline solutions with a high content of sodium ions and ions of other alkali and alkaline earth metals. More specifically, the above invention relates to a technology for recovering lithium in the presence of oxidizing or reducing agents and under conditions of increased radiation. The method is based on the processes of preparation and use of ion sieves.

The term "brines," as used in the context of this patent specification, covers any natural or industrial solutions that contain lithium. Ionic sieves are inorganic ion-exchange sorbents that exhibit the so-called ion-sieve effect resulting from the separation of ions in solution according to the difference in their ionic radii. The sizes of crystallographic positions in the crystal structure of the material corresponding to ions of certain dimensions, and larger ions cannot enter the indicated positions. Thus, the ion-sieve effect ensures high selectivity in sieve-effect sorbents. According to the present invention, a unique feature of the method is that with the addition of $W^{6+}$ ions to the sorbent composition this method, allows obtaining inorganic ion-exchange sorbents with a specific structure, which provides high selectivity, especially for lithium ions.

It is also important to note that in the context of the present description, the term "mixed hydrated niobium and tungsten oxide" does not mean a mechanical mixture of hydrated niobium oxide with hydrated tungsten oxide but rather means a chemical compound of a non-stoichiometric composition.

Soluble niobates suitable for use in the method of the present invention are alkali metal orthoniobates selected from the group consisting of such compounds as $Li_3NbO_4$, $Na_3NbO_4$, $K_3NbO_4$, $Rb_3NbO_4$, $Cs_3NbO_4$.

Soluble tungsten (VI) compounds suitable for use in the method of the present invention may be represented by a monotungstate based on the $WO_4^{2-}$-anion selected from the group consisting of $Li_2WO_4$, $Na_2WO_4$, $K_2WO_4$, $Rb_2WO_4$, $Cs_2WO_4$, $(NH_4)_2WO_4$.

Examples of H-form sorbents suitable for use in the method of the invention are shown below in Table 1 (Li-forms are similar and therefore not included).

As mentioned in U.S. Pat. No. 10,434,497, hydrated niobium pentoxide (HNP) was obtained by the action of 0.1 N HCl on a solution of potassium orthoniobate $K_3NbO_4$ at pH=5.5. In the present invention, $W^{6+}$ ion dopants were added to the solution in the form of a $K_2WO_4$ salt.

To introduce additives of $W^{6+}$ ions into the phase of hydrated oxides, the co-precipitation method was used. In this regard, the ion-exchange properties of the products of the co-precipitation of HNP with $W^{6+}$ ions were studied. The results of the study are shown in FIG. 1.

Figure 1:
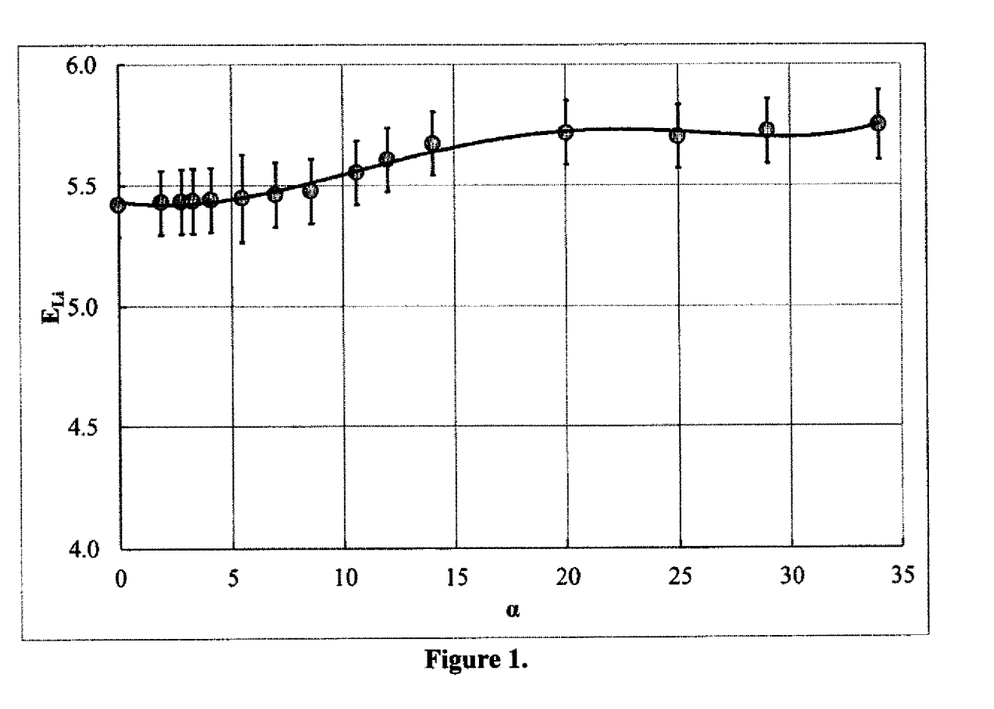
FIG. 1 is a graph illustrating a total exchange capacity of hydrated niobium pentoxide $E_{Li}$ with additives of $W^{6+}$ ions (sorption of lithium from 0.1 N $Li_2CO_3$ solution; α—share of the $W^{6+}$ additive (at. %) in the sorbent composition).

FIG. 1 shows the results of a study of the properties of co-precipitation products of HNP with the addition of $W^{6+}$ ions. The dependence of such properties of hydrated niobium pentoxide as total exchange on the amount of the added $W^{6+}$ was studied in a wide range of the compositions (sorption of lithium from 0.1 N $Li_2CO_3$ solution; a is a share of the $W^{6+}$ additive (at. %) in the sorbent composition).

As mentioned above, the nature of the dependencies indicates that $W^{6+}$ ions are not indifferent diluents and affect the ion-exchange properties of HNP.

An addition of $W^{6+}$ ions should lead to a change in the charge z of the polyanionic framework of a polymeric aquaoxohydroxo complex. By the magnitude and sign of the charge z, one can judge how the additive affects the value of the exchange capacity. At z>0, the additive increases the cation-exchange capacity, creating an excessive charge on the polyanion framework. At z<0, the additive begins to compensate for the excessive charge on the polyanionic framework, which may be associated, e.g., with the ion-exchange mechanism of co-precipitation of ions of the additive and the base. At z=0, the additive functions as an indifferent diluent of the hydrated base oxide. Such interpretation of the additive as an independent component of the mixture provides certain information for analyzing the dependence of the capacity of replaced hydrated oxides on their composition. The technique mentioned above was used for plotting the curve shown in FIG. 2, which illustrates the dependence of parameter z on the amount of addition of $W^{6+}$ ions (where z is a charge of the polyanionic backbone of the polymeric aquaoxohydroxo complex, and; a is a proportion of additives in at. %. as defined above).

Figure 2:
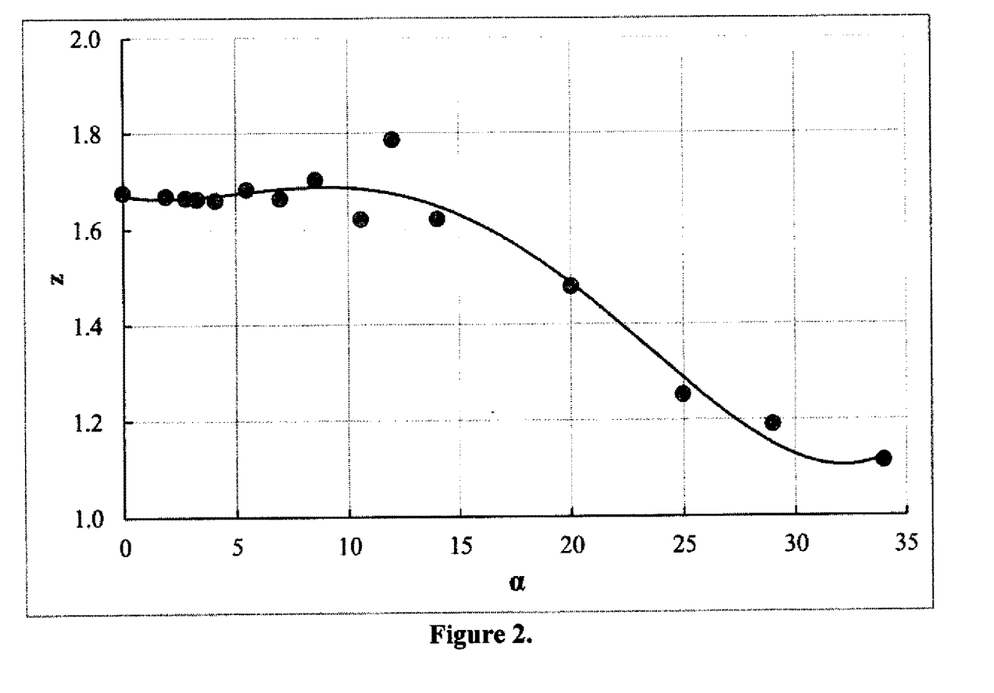
FIG. 2 is a graph illustrating the dependence of parameter z on the amount of addition of $W^{6+}$ ions (z-charge of the polyanionic backbone of the polymeric aquaoxohydroxo complex; α—share of the $W^{6+}$ additive (at. %) in the sorbent composition).

The introduction of additives of $W^{6+}$ ions into the HNP structure leads to a monotonic increase in the cation exchange capacity in the entire studied range of compositions (FIG. 1). However, it is noteworthy that there is a horizontal section on the z curve (FIG. 2). A simple charge balance disorder cannot explain this region since the charge of $W^{6+}$ is greater than that of $Nb^{5+}$ as it can be assumed that such an effect results from structural changes caused in the $Nb^{5+}$-containing HNP by the introduction of $W^{6+}$.

It is known that when small amounts of $W^{6+}$ ions are precipitated with hydrated oxides, they, when pass into a solid phase, acquire the six-fold coordination due to additional binding of water molecules. Therefore, at low degrees of crosslinking, the presence of $WO_6^{6-}$ clusters fully explain the increase in the capacity of mixed hydrated oxides. In the case of large amounts of additives of W6+ ions, they can enter a solid phase in the form of $WO_4^{2-}$ или $HW_6O_{21}^{5-}$ groups, since particular these groups of tungsten are contained in the solution at pH that corresponds to the conditions of synthesis of mixed products. The entry of such groups into the solid phase will lead to a decrease in the negative charge of the matrix even at very low degrees of polymerization.

On the curve of FIG. 2 that expresses the dependence of the parameter z on the composition, there is an inflection point, which can be associated with some rearrangement of the HNP structure when additives are introduced in an amount exceeding a certain critical value.

Figure 3:
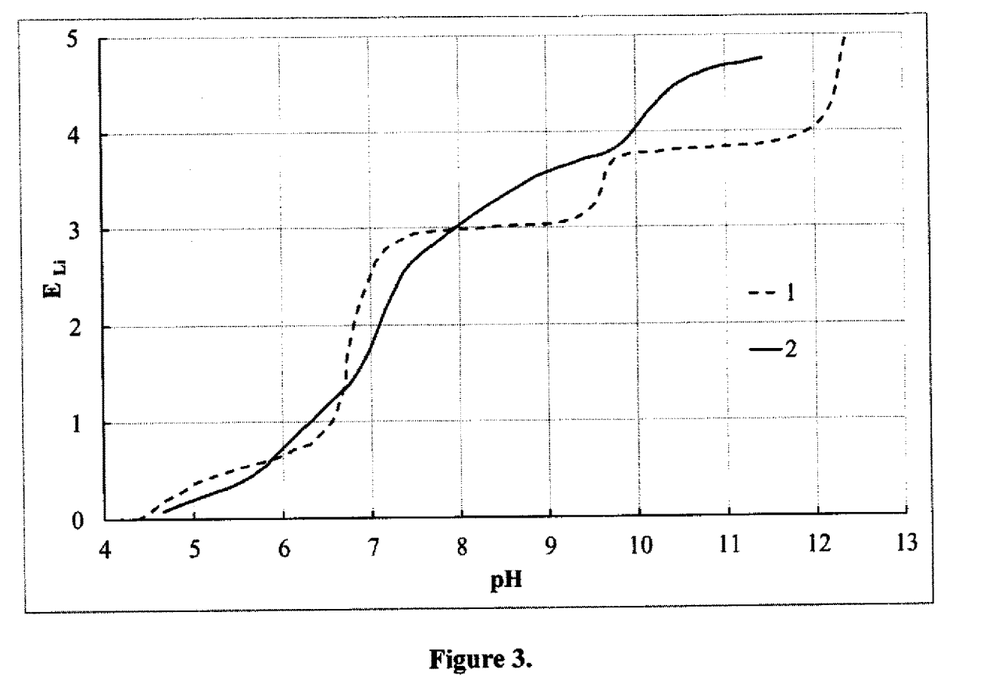
FIG. 3 show curves that illustrate the effect of pH of the sorbent solution on total exchange capacity ($E_{Li}$, mg-eqv of Li per 1 g of sorbent) of hydrated niobium pentoxide (HNP) obtained in the titration of HNP sample without addition (dashed curve) and with the addition of 10.8 at. % of $W^{6+}$ (solid curve), the titration being carried out with 0.1N solution of LiOH (Ionic Strength I=0.1).

The influence of the addition of $W^{6+}$ ions should affect the value of the cation-exchange capacity and the acidity of exchangeable OH-groups due to differences in the physical properties of $Nb^{5+}$ ions and the added ions $W^{6+}$. To clarify the extent of this effect, potentiometric titration of two HNP samples we performed with the addition of $W^{6+}$ ions. Results of this test are shown in FIG. 3, which shows curves that illustrate the effect of pH of the sorbent solution on total exchange capacity ($E_{Li}$, mg-eqv of Li per 1 g of sorbent) of hydrated niobium pentoxide (HNP) obtained in the titration of HNP sample without addition and with the addition of 10.8 at. % of $W^{6+}$, the titration being carried out with 0.1N solution of LiOH (Ionic strength I=0.1).

At the same time, it was found that the potentiometric titration curves of these samples exhibit effects like the analogous dependence for the initial HNP. This dependence was obtained by potentiometric titration of a sample of ion-exchange material with 0.1 N LION solution (I=0.1). The following products were used as samples: 1—HNP without a dopant; 2—HNP with an addition of 10.8 at. % of $W^{6+}$ (FIG. 3). Comparison of the obtained dependences reveals that the most acidic sorption OH groups remained almost unchanged, but their number increased, but the weakly acidic groups were partially acidified (Table 1).

The detected acidification of OH groups with the addition of $W^{6+}$ ions to the HNP phase can be explained by a slightly higher tungsten electronegativity than the electronegativity of niobium [Mulliken P. S. A new electroaffinity scale; together with data on valence states and valence ionization potentials and electron affinities.—J. Chem. Phys., 1934, vol. 3, p. 782-793].

TABLE 1

The acidity of exchangeable OH-groups ($pK_a$) in non-doped and HNP groups doped with $W^{6+}$ions

| $pK_i$ | HNP | $E_i$, mg-eq/g | $pK_i$ | $W^{6+}$ | $E_i$, mg-eq/g |
|---|---|---|---|---|---|
| 1 | 3.6 ± 0.2 | 0.24 | 1 | 3.9 ± 0.1 | 0.60 |
| 2 | 5.1 ± 0.2 | 0.33 | 2 | 5.0 ± 0.2 | 0.74 |
| 3 | 7.3 ± 0.3 | 2.47 | 3 | 6.0 ± 0.3 | 1.47 |
|   |           |      | 4 | 7.4 ± 0.2 | 0.92 |
| 4 | 8.6 ± 0.1 | 0.82 |   |           |      |
| 5 | 9.2 ± 0.2 | 1.59 | 5 | 9.0 ± 0.3 | 1.02 |

Based on the data presented, it can be concluded that the effect of the addition of $W^{6+}$ ions on the sorption properties of HNP is associated with the unexpectedly found effect found at the addition of $W^{6+}$ ions into the solid phase with the structure of the resulting materials.

Thus, it can be noted that HNP co-precipitation products doped with $W^{6+}$ ions have good ion-exchange properties. Changing the pH of the solution makes it quite easy to control the amount of alkali metal ions introduced into their composition, guided by potentiometric titration curves. In this way, three-component oxides of various compositions can be obtained.

Samples selected for the study were prepared by sorption of lithium from a 0.1 N solution of $Li_2CO_3$ on the H-form of an ion exchanger prepared with the addition of $W^{6+}$ ions. The content of lithium in the solid phase was equal to the total exchange capacity of the corresponding materials (FIG. 1). Heat treatment was carried out at a temperature of 540±10° C. for 2÷3 hours. All samples with different amounts of the additive were calcined simultaneously. Changing of calcination duration, a selected time interval of 2 to 3 hours had practically no effect on the ion-exchange properties of the obtained samples.

Figure 4:
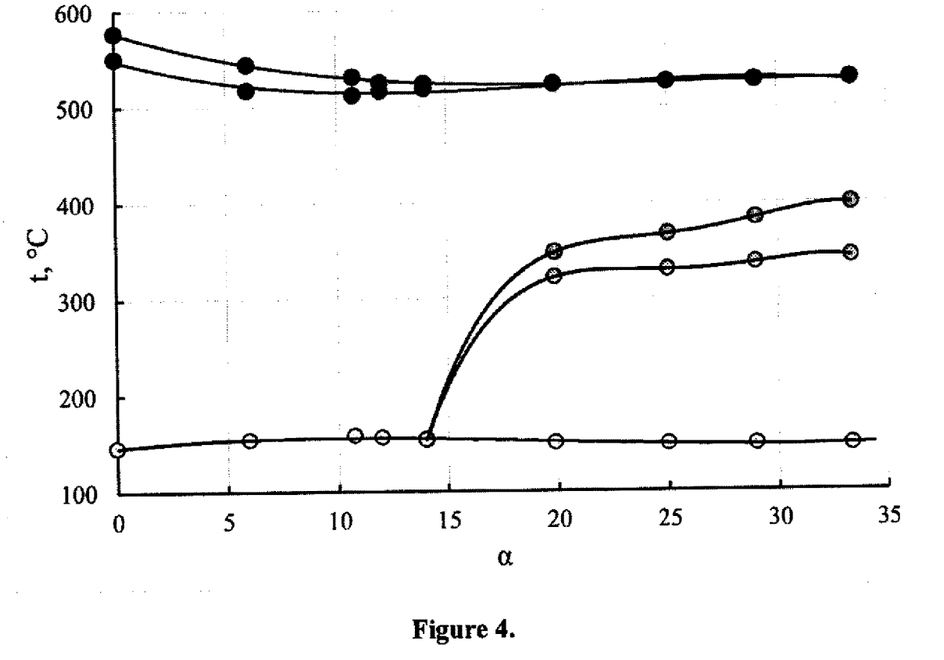
FIG. 4 show graphs illustrating temperatures of maxima of first (1) and second (2) exothermic and first (3), second (4) and third (5) endothermic effects on thermograms of Li-form HNP with additions of ions $W^{6+}$ depending on the added amount (α—share of the $W^{6+}$ additive (at. %) in the sorbent composition).

Thermal analysis showed that the addition of $W^{6+}$ ions to the HNP phase leads to some changes in the processes when these materials are heated (FIG. 4). These changes are manifested both in their crystallization and dehydration processes. As can be seen from FIG. 4, an addition of $W^{6+}$ ions, especially in large amounts, leads to additional dehydration effects. FIG. 4 show graphs illustrating temperatures of maxima of exothermic (1,2) and endothermic (3,4,5) effects on thermograms of HNP of Li with additions of ions $W^{6+}$ depending on the added amount (α, .at. %).

This phenomenon can be explained by an increase in the density of the structure and diffuse inhibition of the dehydration process. In the case of additions of $W^{6+}$ ions, the appearance of the second and third endothermic effects may be associated with an increase in bond strength between OH groups and the ion exchanger matrix. For $W^{6+}$ additives, a transition from two-stage to one-stage crystallization is observed, associated with merging both processes. Additives of $W^{6+}$ lead to a decrease in the crystallization temperature of the synthesized samples by 50-70° C. By comparing the number of ions involved in exchange for samples calcined at 400° C. with a total lithium content in the solid phase, one can notice the almost complete absence of non-exchangeable lithium, up to ~4 at. % of $W^{6+}$ additive. At the same time, no crystallization of the $LiNbO_3$ phase is observed in these samples. This effect can be related to the difficulty in crystallizing the $LiNbO_3$ phase with additions of $W^{6+}$ ions less than 4 at. %. A further decrease in the exchange capacity of the material is due to the appearance of a crystallized phase of lithium niobate. With the addition of $W^{6+}$ ions, a small amount of the amorphous phase is observed.

Figure 6:
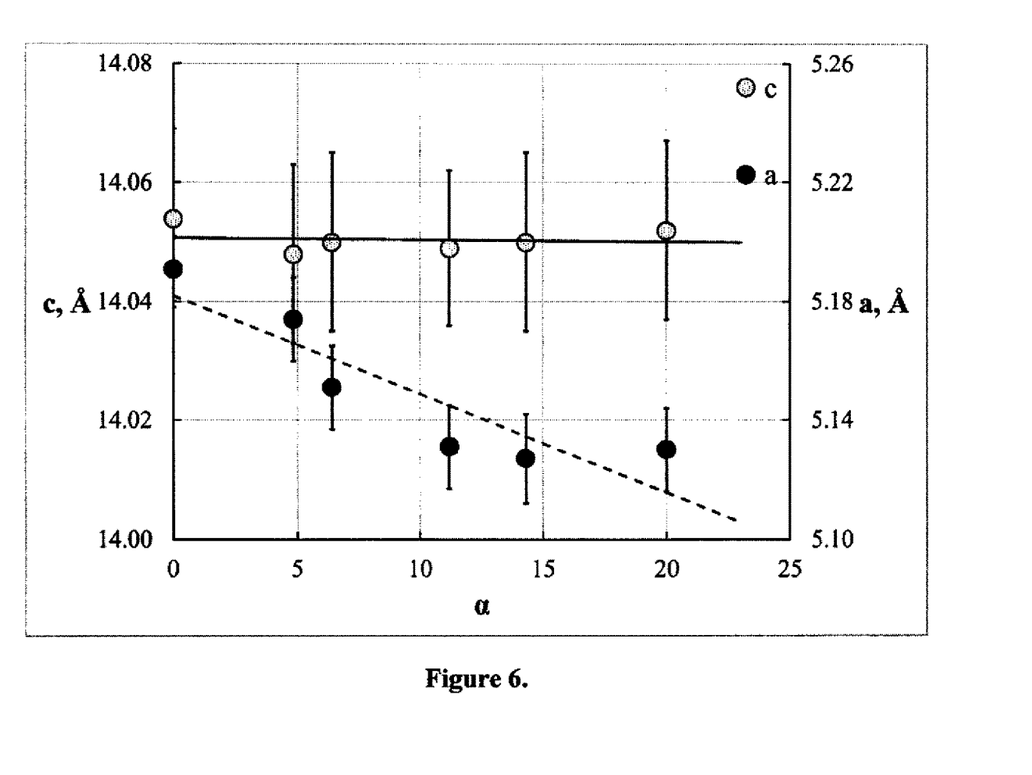
FIG. 6 is a graph illustrating the effect of the added amount of $W^{6+}$ ions in the sorbent composition on parameters "a" and "c" of the hexagonal cell in the $LiNb_{O3}$ phase (α—as defined above).

Thus, it was shown that $W^{6+}$ ions significantly affect the unit cell parameters formed during the synthesis of the $LiNbO_3$ phase. As noted earlier, the structure of $LiNbO_3$ corresponds to the hexagonal syngony with parameters a=5.150 Å, c=13.816 Å [Abrahams S. C., Reddy J. M., Bernstein J. L. Ferroelectric lithium niobates. 3 rep. J Phys. Chem. Solid, 1966, vol. 27, p. 997-1010]. The lattice parameters of lithium niobate obtained by the applicants during the synthesis were the following: a=5.151±0.027 Å; c=14.065±0.015 Å. The introduction of additives of $W^{6+}$ ions has a noticeable effect on the cell parameters, and this effect mainly affects parameter c, which reflects the distance between the layers of NbO6 octahedra (FIG. 6). FIG. 6 is a graph illustrating the effect of the added amount of $W^{6+}$ ions in the sorbent composition on parameters "a" (1) and "c" (2) of the hexagonal cell in the $LiNbO_3$ phase (α—as defined above).

The observed decrease in the unit cell parameters confirms the assumption about the increase of density in the synthesized materials obtained in the analysis of thermographic data. Therefore, for samples with additions of $W^{6+}$ ions, one can expect some increase in the selectivity to $Li^+$ ions and, at the same time, an increase in the amount of non-exchangeable lithium.

As is known from the above reference to Abrahams S. C., et al., in lithium niobate's structure, there are ⅔ octahedral positions occupied by $Li^+$ and $Nb^{5+}$ ions, and ⅓ of the positions are vacant. $W^{6+}$ ions, having a certain crystallochemical affinity for $Nb^{5+}$ ions, can replace them in the crystal lattice or occupy vacant octahedral positions. Based on the data obtained, it can be assumed that, when the content of $W^{6+}$ ions is less than 4 at. %, the $W^{6+}$ ions preferentially occupy positions in which $Nb^{5+}$ ions are usually found. This leads to excess electron density on them and a strong octahedral field.

If $W^{6+}$ ions are added to the sorbent phase in an amount below 2-3 at. %, this does not give the effect of increasing in the capacity and selectivity of the ion exchanger to lithium ions. Additions of $W^{6+}$ ions to the sorbent phase in an amount of more than 8-12 at. % also leads to a decrease in the capacity and selectivity of the ion exchanger to the level of an ion exchanger based on HPN without the addition of $W^{6+}$ ions.

Thus, the interaction of niobates with the acid is carried out in the presence of a tungsten (VI) salt at an ionic ratio of niobium (V) to tungsten (VI) being in a range of 1 to (0.04 to 0.12). In fact, in this the ionic ratio is practically corresponds to at % divided by 100.

Conversion of the lithium-form of the inorganic ion-exchanger into an H-form of the inorganic ion-exchanger is carried out by treating it with an acid solution selected from the group consisting of nitric ($HNO_3$), hydrochloric (HCl), sulfuric ($H_2SO_4$) or perchloric acid ($HClO_4$).

When the amount of $W^{6+}$ ions added to the sorbent phase exceeds 4 atomic %, these ions enter predominantly vacant octahedral positions. This fact confirms the assumption, made earlier in the analysis of the initial HNP (H-form) ion-exchange properties with the addition of $W^{6+}$ ions (FIG. 1), that the addition of these ions in an amount of less than 4 at. % isomorphically replaces the $Nb^{5+}$ ions in the solid phase during co-precipitation. The addition of these ions in amounts of more than 4 at. % causes their co-precipitation already at the stage of ion-exchange The first trend, associated with the formation of substitutional solid solutions, should increase the probability of the release of $Li^+$ ions from their positions. The second trend, on the contrary, should lead to a decrease in the exchange capacity due to the closure of the channels in which $Li^+$ ions are located in the $LiNbO_3$ phase by $Nb^{5+}$ ion.

Figure 7:
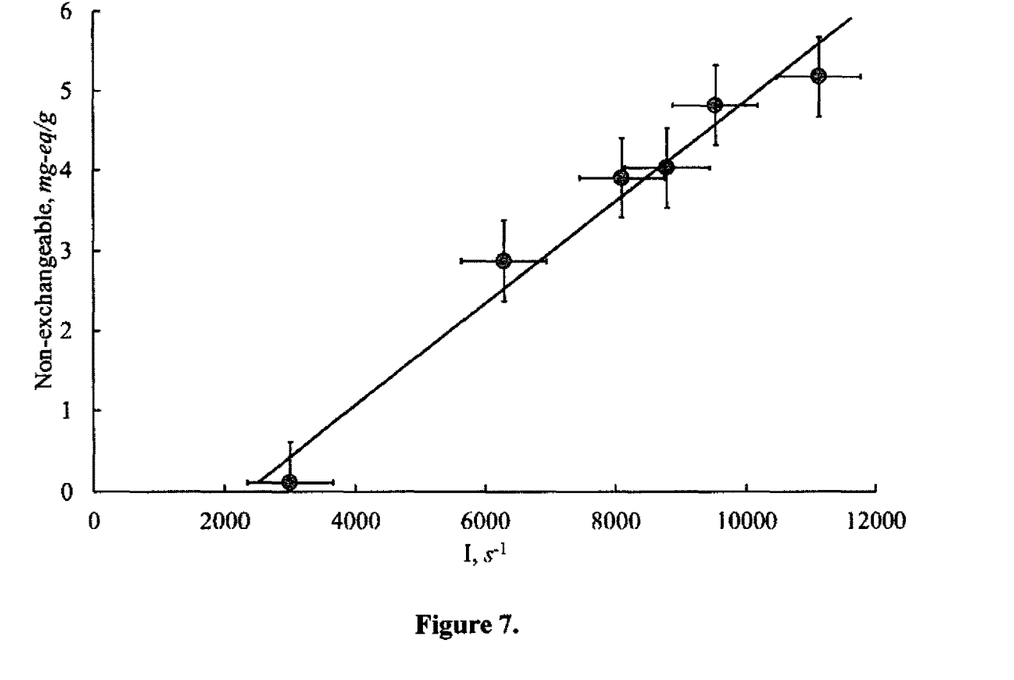
FIG. 7 shows the correlation of the intensity of the line 2Θ=29.7° of the $LiNb_{O3}$ phase with the amount of non-exchangeable lithium (mg-eq/g) in samples with the addition of $W^{6+}$ ions.

To reveal factors that determine the ion-exchange properties of the synthesized materials, the applicants performed a correlation analysis of the dependences of the amount of non-exchangeable lithium and the intensity of one of the lines of the lithium niobate phase. At the same time, linear correlations of these parameters were found (FIG. 7). FIG. 7 shows the correlation of the intensity of the line 2Θ=29.7° of the $LiNbO_3$ phase with the amount of non-exchangeable lithium (mg-eq/g) for samples with the addition of $W^{6+}$ ions. It is clearly seen from this data that, at a low crystallinity of the lithium niobate phase, no non-exchangeable lithium is formed at all.

With the addition of $W^{6+}$ ions, lithium ions, which are in a crystalline phase, partly participate in the ion exchange. These effects can be related to the different nature of incorporating additive ions into a solid phase.

Figure 5:
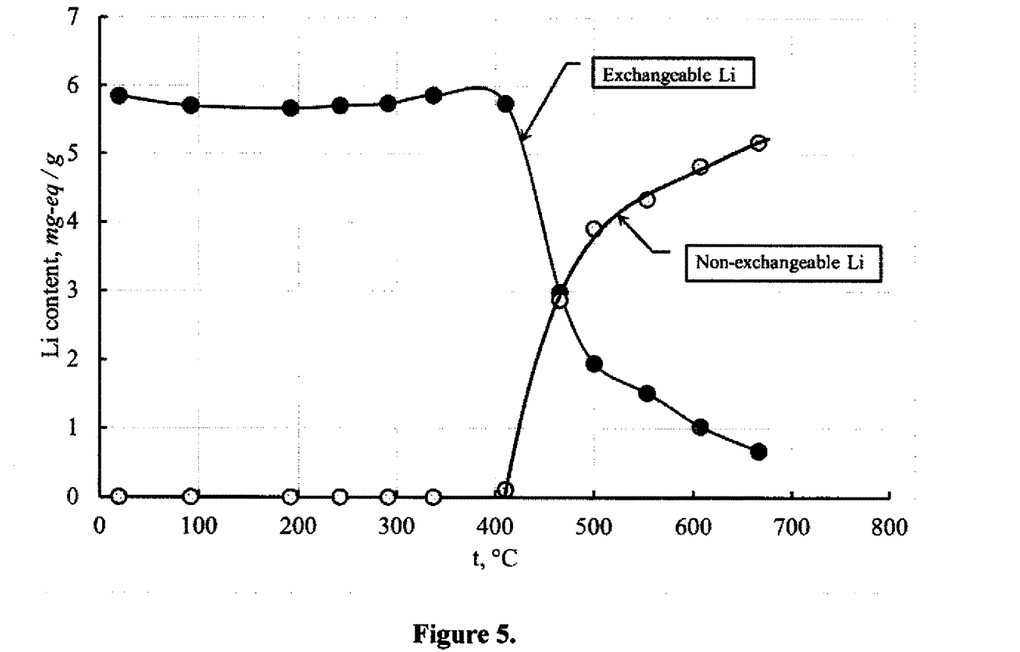
FIG. 5. Curves that show the dependence of the content of exchangeable and non-exchangeable lithium (in the sorbent composition calculated from the hydrolyzability of NHP with the addition of $W^{6+}$ ions in a solution of 0.1N HCl) on the calcination temperature of samples (sample composition: $Li_{0.75}NbO_{2.88} \cdot 0.12WO_3 \cdot 1.47H_2O$).
Figure 8:
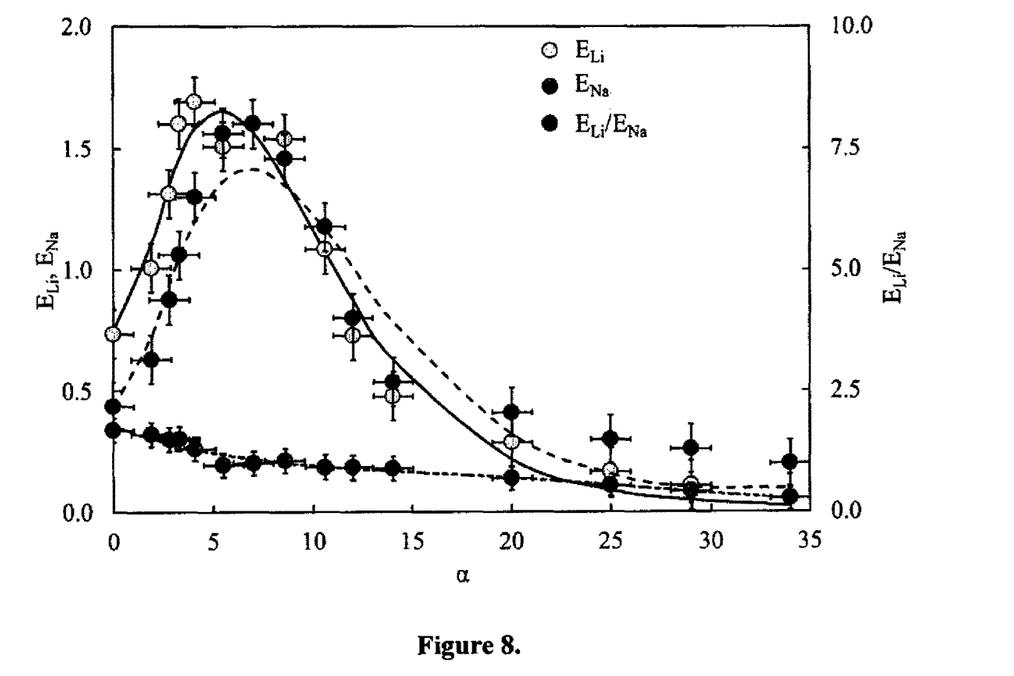
FIG. 8 shows dependence of lithium capacity ($E_{Li}$; mg-eq of Li per 1 g of sorbent), sodium capacity ($E_{Na}$; mg-eq of Na per 1 g of sorbent), and $E_{Li}/E_{Na}$ ratio in the solid phase of the sorbent during sorption from a model complex solution with Li/Na=1/10.

The performed X-ray phase analysis showed that heat treatment of all the studied samples at a temperature exceeding the temperature of exothermic effects leads to the crystallization of the $LiNbO_3$ phase. Moreover, the nature of the X-ray patterns does not depend on how the crystallization proceeded—in two stages or one. (See FIG. 5). FIG. 8 shows dependence of lithium capacity (Eu; mg-eq of Li per 1 g of sorbent), sodium capacity ($E_{Na}$; mg-eq of Na per 1 g of sorbent), and $E_{Li}/E_{Na}$ ratio in the solid phase of the sorbent during sorption from a model complex solution with Li/Na=1/10.

Figure 9:
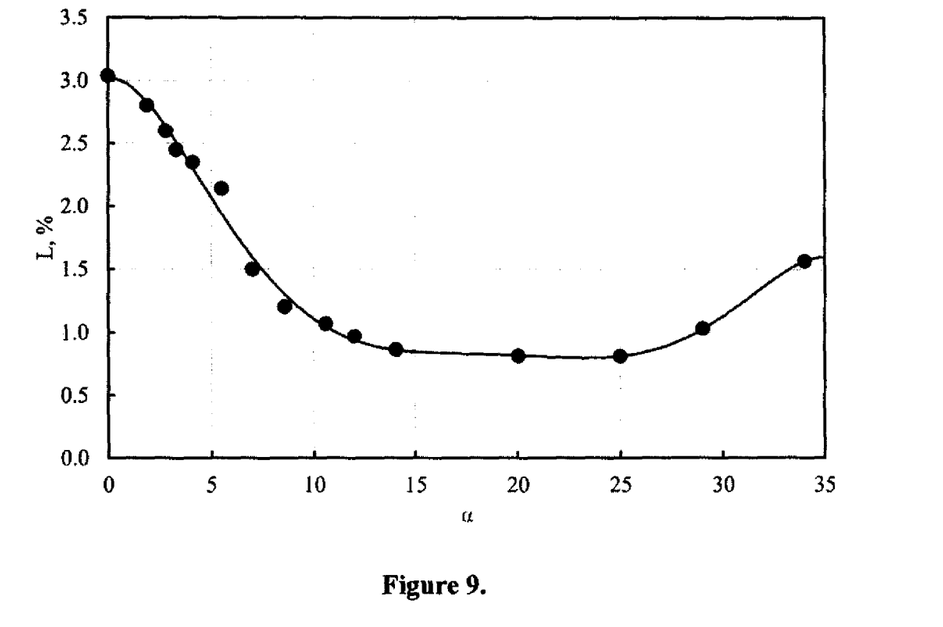
FIG. 9 shows losses of sorbents for one cycle of operation in the mode of sorption-desorption for samples with the addition of $W^{6+}$ ions (α, at. %; the sample being calcined at 540° C.).

In this case, an addition of $W^{6+}$ ions leads to a decrease in the value of $E_{Na}$ (FIG. 8). This effect, which is observed even with a slight increase in the capacity for $Li^+$ ions (FIG. 8), leads to a very significant increase in the $E_{Li}/E_{Na}$ ratio (FIG. 8), which is selectivity. This phenomenon occurs due to a decrease in lithium niobate unit cell parameters caused by the addition of $W^{6+}$ ions (FIG. 6). With an increase in the amount of addition of $W^{6+}$ ions, the losses of the resulting materials also decrease during their operation in sorption and desorption cycles (FIG. 9). FIG. 9 illustrates chemical stability during sorption from a solution of a complex composition.

The invention will be further illustrated by practical examples that should not be considered limiting the scope of application of the present invention.

EXAMPLES

Example 1

2 liters of a 0.05 M $K_3NbO_4$ solution (pH=12.7) is combined with a given amount of a 0.05 M $K_2WO_4$ solution. Then, a 1.0 M HCl solution is poured in vigorous stirring until a suspension with pH=5-6 is obtained. The resulting precipitate is washed by successive decanting to a residual potassium concentration of 0.08-0.09 WI, and the obtained product is frozen at −5° C. for 30 hours. After thawing, the granulate is placed in an ion-exchange column, and 4.5 l of 0.1 M lithium carbonate solution is passed through. The precipitate is unloaded from the column, dried in the air, heated to a temperature of 500-540° C. (temperature rise rate 10° C. deg/min), and maintained at this temperature for 3 hours. As a result, a sorbent is obtained in the lithium form, the main fraction of which is 0.2-0.6 mm granules.

The influence of the mode of operations used for obtaining an ion exchanger on its sorption properties and the purity of the resulting lithium salt are summarized in Table. 1. When testing the ion exchanger, a solution of the following composition g/l was used: $Li_2SO_4$-5.5; NaCl, 56.0; NaOH, 3.0; pH 12.1. Lithium is eluted from the sorbent with a 0.1 M $HNO_3$ solution.

Examples of sorbents of various compositions obtained by the proposed method in the form of the H-form are given below in Table 2 (Li-forms are similar and therefore not included).

TABLE 2

Influence of Preparation Conditions on the Composition and Properties of Sorbents

| The sorbent obtaining conditions | | | Test results | | | |
|---|---|---|---|---|---|---|
| W(VI):Nb(V) ratio in solution during synthesis | Treatment temperature T, ° C. | Sorbent composition* | Total ion exchange capacity $E_{Li0}$, mg-eqv/g | Selective capacity by Li, $E_{Li1}$, mg-eqv/g | Li—Na separation coefficient, $P_{Li, Na}$ | The output of the fraction 0.2 ÷ 0.7 mm, mass % |
| 0.019:1 | 450 | $H_{0.65}NbO_{2.82}\cdot 0.05Li_2O\cdot 0.02WO_3$ | 2.21 | 1.87 | 54.1 | 97 |
| 0.033:1 | 420 | $H_{0.65}NbO_{2.82}\cdot 0.05Li_2O\cdot 0.03WO_3$ | 2.35 | 2.05 | 68.0 | 98 |
| 0.041:1 | 470 | $H_{0.65}NbO_{2.82}\cdot 0.05Li_2O\cdot 0.04WO_3$ | 2.41 | 2.12 | 72.2 | 96 |
| 0.055:1 | 400 | $H_{0.69}NbO_{2.85}\cdot 0.03Li_2O\cdot 0.05WO_3$ | 2.52 | 2.26 | 86.0 | 98 |
| 0.070:1 | 450 | $H_{0.70}NbO_{2.85}\cdot 0.03Li_2O\cdot 0.07WO_3$ | 2.56 | 2.32 | 96.3 | 95 |
| 0.086:1 | 460 | $H_{0.67}NbO_{2.83}\cdot 0.04Li_2O\cdot 0.09WO_3$ | 2.40 | 2.18 | 97.6 | 94 |
| 0.106:1 | 450 | $H_{0.61}NbO_{2.80}\cdot 0.07Li_2O\cdot 0.10WO_3$ | 2.27 | 2.04 | 88.5 | 98 |
| 0.120:1 | 430 | $H_{0.54}NbO_{2.77}\cdot 0.10Li_2O\cdot 0.12WO_3$ | 2.00 | 1.76 | 74.8 | 97 |
| 0.140:1 | 460 | $H_{0.50}NbO_{2.77}\cdot 0.12Li_2O\cdot 0.14WO_3$ | 1.81 | 1.58 | 68.0 | 95 |
| 0.200:1 | 500 | $H_{0.45}NbO_{2.77}\cdot 0.14Li_2O\cdot 0.20WO_3$ | 1.22 | 1.03 | 54.0 | 94 |
| 0.070:1 | 380 | $H_{0.70}NbO_{2.85}\cdot 0.01Li_2O\cdot 0.07WO_3$ | 2.51 | 2.02 | 41.3 | 95 |
| 0.070:1 | 550 | $H_{0.70}NbO_{2.85}\cdot 0.03Li_2O\cdot 0.07WO_3$ | 2.03 | 1.84 | 96.3 | 95 |

*The composition of the sorbent in ion-exchangeable H-form prepared for the sorption of lithium The test data for sorbent samples of various compositions presented in the table and FIG. 8 show that the W/Nb ratio in the range from 0.01 to 0.2 is the optimal mode of sorbent synthesis. Synthesis temperature—500-540° C.

The advantages of the sorbent obtained under optimal conditions according to the proposed method over the prototype can be seen from the results of their comparative tests, which are shown in Table 3. The tests were carried out using a solution of the above composition.

TABLE 3

The table shows average results for 5 cycles of sorbent operations

| Sorbent | Sorption capacity, mg-eq/g | | Separation coefficient, $P_{Li, Na}$ | Content of $NaNO_3$ in obtained $LiNO_3$. mass % |
|---|---|---|---|---|
| | Lithium | Sodium | | |
| Known | 2.27 | 0.20 | 37.6 | 19.1 |
| Proposed | 2.46 | 0.37 | 74.3 | 11.5 |

As shown from Table 3, the sorbent obtained by the method of the invention has approximately 1.5 times higher selectivity for lithium ions than the sorbent synthesized by the known method. This makes it possible to reduce the content of the $NaNO_3$ impurity in the obtained lithium salt almost with a factor of 2.

The invention claimed is:

1. A method of manufacturing inorganic ion exchanger for the selective extraction of lithium from lithium-containing natural and technological brines, the inorganic ion exchanger being represented by the following general formula:

$$H_aNbO_{(2.5+0.5\cdot a)}\cdot bLi_2O\cdot cWO_3\cdot dH_2O;$$

wherein:
"a" is a number ranging from 0.5 to 2.0,
"b" is a number ranging from 0.01 to 0.5,
"c" is a number ranging from 0.01 to 0.2, and
"d" is a number ranging from 0.1 to 2.0, wherein the method comprising the following steps:
interacting a soluble niobate (V) with an acid that contains at least one soluble tungsten (VI) compound, thus forming a hydrated niobium (V) oxide and a hydrated tungsten (VI) oxide, which co-precipitate and form a mixed hydrated niobium (V) and tungsten (VI) oxide;
granulating the mixed hydrated niobium (V) and tungsten (VI) oxide by freezing with subsequent defreezing, thus obtaining a granulated mixed hydrated niobium (V) and tungsten (VI) oxide;
converting the granulated mixed hydrated niobium (V) and tungsten (VI) oxide into a lithium form by treating thereof with a lithium-containing compound selected from the group consisting of aqueous solutions of lithium hydroxide and lithium carbonate;
calcining the lithium form of the granulated mixed hydrated niobium (V) and tungsten (VI) oxide to obtain a mixed granulated tripled lithium, niobium (V) and tungsten (VI) oxide, which constitutes a lithium-form of the inorganic ion-exchanger; and
converting the lithium-form of the inorganic ion-exchanger into an H-form of the inorganic ion-exchanger by treating thereof with an acid solution.

2. The method of claim 1, wherein the polymeric aqua-oxo-hydroxo complex is a polymeric aqua-oxo-hydroxo complex of niobium and tungsten in the form of solid particles.

3. The method of claim 2, wherein the soluble niobate (V) is an alkali metal orthoniobate selected from the group consisting of $Li_3NbO_4$, $Na_3NbO_4$, $K_3NbO_4$, $Rb_3NbO_4$, $Cs_3NbO_4$.

4. The method of claim 1, wherein the soluble tungsten (VI) compound is a monotungstate based on the $WO_4^{2-}$ anion and selected from the group consisting of $Li_2WO_4$, $Na_2WO_4$, $K_2WO_4$, $Rb_2WO_4$, $Cs_2WO_4$, $(NH_4)_2WO_4$.

5. The method of claim 3, wherein the soluble tungsten (VI) compound is a monotungstate based on the $WO_4^{2-}$ anion and selected from the group consisting of $Li_2WO_4$, $Na_2WO_4$, $K_2WO_4$, $Rb_2WO_4$, $Cs_2WO_4$, $(NH_4)_2WO_4$.

6. The method of claim 1, wherein the interaction of niobates with acid is carried out in the presence of a tungsten (VI) salt at an ionic ratio of niobium (V) to tungsten (VI) being in a range of 1 to (0.04 to 0.12).

7. The method of claim 1, wherein the step of freezing is carried out for 24 to 48 hours at a temperature in a range of −4° C. to −10° C.

8. The method of claim 3, wherein the step of freezing is carried out for 24 to 48 hours at a temperature in a range of −4° C. to −10° C.

9. The method of claim 4, wherein the step of freezing is carried out for 24 to 48 hours at a temperature in a range of −4° C. to −10° C.

10. The method of claim 1, wherein the step of calcining is carried out at a temperature in the range of 450° C. to 550° C.

11. The method of claim 3, wherein the step of calcining is carried out at a temperature in the range of 450° C. to 550° C.

12. The method of claim 4, wherein the step of calcining is carried out at a temperature in the range of 450° C. to 550° C.

13. The method of claim 7, wherein the step of calcining is carried out at a temperature in the range of 450° C. to 550° C.

14. The method of claim 1, wherein the step of converting the granulated mixed hydrated niobium (V) and tungsten (VI) oxide into a lithium form, is carried out with a solution of an acid selected from the group consisting of nitric ($HNO_3$), hydrochloric (HCl), sulfuric ($H_2SO_4$) or perchloric acid ($HClO_4$).

15. The method of claim 2, wherein the step of converting the granulated mixed hydrated niobium (V) and tungsten (VI) oxide into a lithium form, is carried out with a solution of an acid selected from the group consisting of nitric ($HNO_3$), hydrochloric (HCl), sulfuric ($H_2SO_4$) or perchloric acid ($HClO_4$).

16. The method of claim 3, wherein the step of converting the granulated mixed hydrated niobium (V) and tungsten (VI) oxide into a lithium form, is carried out with a solution of an acid selected from the group consisting of nitric ($HNO_3$), hydrochloric (HCl), sulfuric ($H_2SO_4$) or perchloric acid ($HClO_4$).

17. The method of claim 11, wherein the step of converting the granulated mixed hydrated niobium (V) and tungsten (VI) oxide into a lithium form, is carried out with a solution of an acid selected from the group consisting of nitric ($HNO_3$), hydrochloric (HCl), sulfuric ($H_2SO_4$) or perchloric acid ($HClO_4$).

* * * * *